(12) United States Patent
Tanaka

(10) Patent No.: US 12,445,730 B2
(45) Date of Patent: Oct. 14, 2025

(54) CONTROL APPARATUS, METHOD, AND NON-TRANSITORY STORAGE MEDIUM FOR SMART TRACKING CONTROL

(71) Applicant: CANON KABUSHIKI KAISHA, Tokyo (JP)

(72) Inventor: Ryo Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/058,423

(22) Filed: Nov. 23, 2022

(65) Prior Publication Data

US 2023/0179867 A1     Jun. 8, 2023

(30) Foreign Application Priority Data

Nov. 30, 2021    (JP) ................................. 2021-194557

(51) Int. Cl.
    *H04N 23/695*      (2023.01)
    *H04N 23/611*      (2023.01)

(52) U.S. Cl.
    CPC ......... *H04N 23/695* (2023.01); *H04N 23/611* (2023.01)

(58) Field of Classification Search
    CPC .......... G06T 2207/20021; G06T 17/20; G06V 10/235; G06V 10/50; G06V 10/62; G06V 20/00; G06V 40/23; H04N 23/61; H04N 23/611; H04N 23/62; H04N 23/64; H04N 23/69; H04N 23/695

USPC ......................................................... 348/169
See application file for complete search history.

(56) References Cited

U.S. PATENT DOCUMENTS

| | | | |
|---|---|---|---|
| 2019/0230269 A1* | 7/2019 | Saito ................ | G08B 13/19617 |
| 2020/0242780 A1* | 7/2020 | Magai ....................... | G06T 7/11 |

FOREIGN PATENT DOCUMENTS

| | | | | |
|---|---|---|---|---|
| EP | 4075787 | A1 | | 10/2022 |
| JP | H07030795 | A | | 1/1995 |
| JP | 2005236508 | A | * | 9/2005 |
| JP | 2006033188 | A | * | 2/2006 |
| JP | 2008079216 | A | | 4/2008 |
| JP | 2011030040 | A | | 2/2011 |
| JP | 2017046321 | A | | 3/2017 |
| JP | 2021016134 | A | | 2/2021 |
| WO | 2020079807 | A1 | | 4/2020 |
| WO | WO-2021145071 | A1 | * | 7/2021 ............. G06T 7/246 |

* cited by examiner

*Primary Examiner* — William C Vaughn, Jr.
*Assistant Examiner* — Astewaye Gettu Zewede
(74) *Attorney, Agent, or Firm* — Canon U.S.A., Inc., IP Division

(57) ABSTRACT

A control apparatus includes a control unit configured to control an imaging range of an imaging unit to track a tracking target, and a setting unit configured to set a search area based on a range set by a user, a user operation for controlling the imaging range, or a past position of the tracking target, wherein the control unit controls the imaging range to search for the tracking target in the search area in a case where tracking of the tracking target has failed.

6 Claims, 13 Drawing Sheets

CONTROL APPARATUS, METHOD, AND NON-TRANSITORY STORAGE MEDIUM FOR SMART TRACKING CONTROL

BACKGROUND OF THE INVENTION

Field of the Invention

The present invention relates to a method of controlling an imaging apparatus.

Description of the Related Art

Conventionally, an imaging apparatus capable of performing pan/tilt control is equipped with a human figure detection function, and has an automatic tracking function of controlling pan/tilt to keep holding a subject detected from a captured image at a position close to the center of an imaging range.

Further, depending on the motion of a subject that is a tracking target, the automatic tracking function can lose track of the subject, for example, when failing to detect the subject, and the automatic tracking function has a function of searching for the subject again. Japanese Patent Application Laid-Open No. 2017-46321 discusses a technique of searching for a tracking target by increasing an angle of view by zooming out in a case where the tracking target is lost.

However, in Japanese Patent Application Laid-Open No. 2017-46321, for example, in a case where the tracking target has moved away from a position at which track of the tracking target has been lost, the tracking target cannot be rediscovered just by zooming out.

SUMMARY OF THE INVENTION

According to an aspect of the present invention, a control apparatus includes a control unit configured to control an imaging range of an imaging unit to track a tracking target, and a setting unit configured to set a search area based on a range set by a user, a user operation for controlling the imaging range, or a past position of the tracking target, wherein the control unit controls the imaging range to search for the tracking target in the search area in a case where tracking of the tracking target has failed.

Further features of the present invention will become apparent from the following description of embodiments with reference to the attached drawings.

DESCRIPTION OF THE EMBODIMENTS

Embodiments according to the present invention will be described below with reference to the attached drawings. Configurations to be described in the following embodiments are merely examples, and the embodiments are not limited to the illustrated configurations. Each of the embodiments of the present invention described below can be implemented solely or as a combination of a plurality of the embodiments or features thereof where necessary or where the combination of elements or features from individual embodiments in a single embodiment is beneficial.

Figure 1:
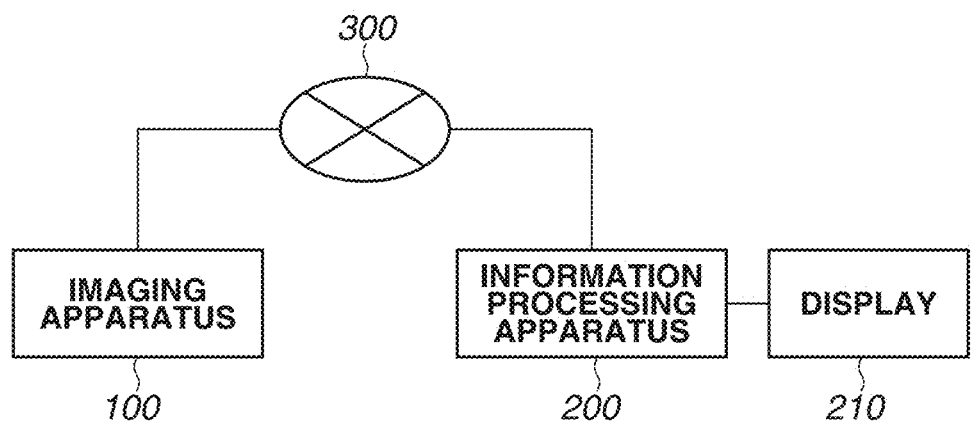
FIG. 1 is a diagram illustrating an example of a system.

FIG. 1 is a diagram illustrating a system configuration according to a first embodiment. A system according to the present embodiment includes an imaging apparatus 100, an information processing apparatus 200, a display 210, and a network 300.

The imaging apparatus 100 and the information processing apparatus 200 are interconnected via the network 300. The network 300 is implemented by, for example, a plurality of routers, switches, and cables compliant with a communication standard such as Ethernet (registered trademark). The network 300 may be implemented by the Internet, a wired local area network (LAN), a wireless LAN, a wide area network (WAN), or the like.

The imaging apparatus 100 is an apparatus that captures an image, and also functions as a control apparatus that can change an imaging range by controlling at least one of pan, tilt, and zoom.

The imaging apparatus 100 transmits image data of a captured image, information about the date and time of capture of the image, identification information for identifying the imaging apparatus 100, and information about an imaging range of the imaging apparatus 100 to an external apparatus such as the information processing apparatus 200, via the network 300. The information processing apparatus 200 is, for example, a client apparatus such as a personal computer on which a program for implementing a function of processing to be described below is installed. In the system according to the present embodiment, one imaging apparatus 100 is provided, but a plurality of imaging apparatuses 100 may be provided. In other words, the plurality of imaging apparatuses 100 may be connected to the information processing apparatus 200 via the network 300. In this case, for example, using identification information associated with a transmitted image, the information processing apparatus 200 determines which one of the plurality of imaging apparatuses 100 has captured the transmitted image.

The display 210 includes a liquid crystal display (LCD) or the like, and displays an image captured by the imaging apparatus 100, or the like. The display 210 is connected to the information processing apparatus 200 via a display cable compliant with a communication standard such as High-Definition Multimedia Interface (HDMI) (registered trademark). The display 210 and the information processing apparatus 200 may be disposed in a single housing.

Figure 2:
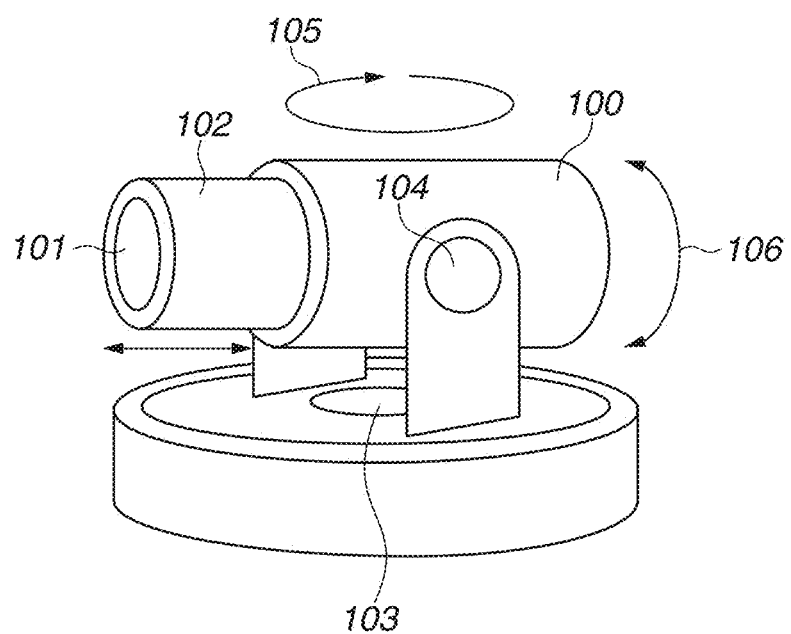
FIG. 2 is a diagram illustrating an example of an appearance of an imaging apparatus.
Figure 3:
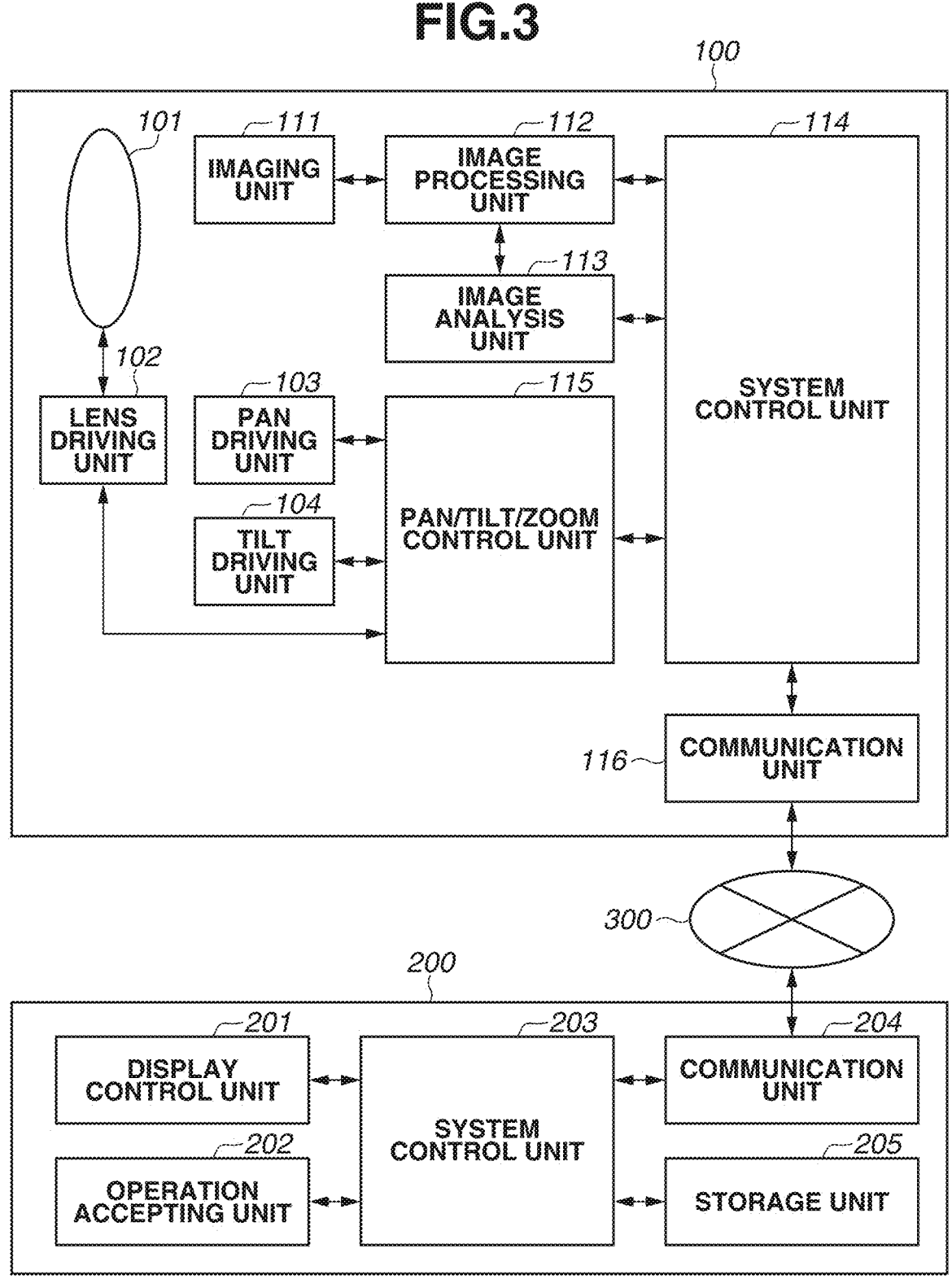
FIG. 3 is a diagram illustrating functional blocks of the imaging apparatus.

Next, the imaging apparatus 100 according to the present embodiment will be described with reference to FIG. 2 and FIG. 3. FIG. 2 illustrates an example of an external view of the imaging apparatus 100 according to the present embodiment. FIG. 3 illustrates an example of functional blocks of the imaging apparatus 100 and the information processing apparatus 200 according to the present embodiment. Among the functional blocks of the imaging apparatus 100 illustrated in FIG. 3, functions such as an image processing unit 112, an image analysis unit 113, a system control unit 114, a pan/tilt/zoom control unit 115, and a communication unit 116 are implemented as follows. Specifically, these functions are implemented by a central processing unit (CPU) 1300 of the imaging apparatus 100 executing a computer program stored in a read only memory (ROM) 1320 of the imaging apparatus 100. The ROM 1320 and the CPU 1300 will be described below with reference to FIG. 13.

A direction in which the optical axis of a lens 101 points is an imaging direction of the imaging apparatus 100, and a light beam that passes through the lens 101 is focused on an image sensor of an imaging unit 111 of the imaging apparatus 100. A lens driving unit 102 includes a driving system for driving the lens 101, and changes a focal length of the lens 101. The lens driving unit 102 is controlled by the pan/tilt/zoom control unit 115.

A pan driving unit 103 includes a mechanical drive system for performing pan operation and a motor as a drive source, and rotates the imaging direction of the imaging apparatus 100 in a pan direction 105. The pan driving unit 103 is controlled by the pan/tilt/zoom control unit 115.

A tilt driving unit 104 includes a mechanical drive system for performing tilt operation and a motor as a drive source, and rotates the imaging direction of the imaging apparatus 100 in a tilt direction 106. The tilt driving unit 104 is controlled by the pan/tilt/zoom control unit 115.

The imaging unit 111 includes an image sensor (not illustrated) such as a charge coupled device (CCD) sensor or a complementary metal oxide semiconductor (CMOS) sensor. The imaging unit 111 generates an electrical signal by photoelectrically converting a subject image formed thereon upon passing through the lens 101. The image processing unit 112 generates image data of a captured image by performing processing for converting the electrical signal, which is generated by a photoelectrical conversion by the imaging unit 111, into a digital signal, and image processing such as compression coding processing.

The image analysis unit 113 performs processing for detecting a specific subject to be a tracking target from the image (i.e., the image captured by the imaging unit 111) of the image data generated by the image processing unit 112, using a known technology such as deep learning. For example, a human figure is detected as the specific subject. The image analysis unit 113 may detect a specific human figure registered beforehand as the tracking target by matching using feature data of images of facial parts. As the method for detecting the human figure that is the tracking target from the image, pattern matching may be used, or a trained model which is trained by machine learning may be used.

The pan/tilt/zoom control unit 115 controls pan, tilt, and zoom of the imaging apparatus 100 by controlling the pan driving unit 103, the tilt driving unit 104, and the lens driving unit 102 based on an instruction from the system control unit 114.

Figure 13:
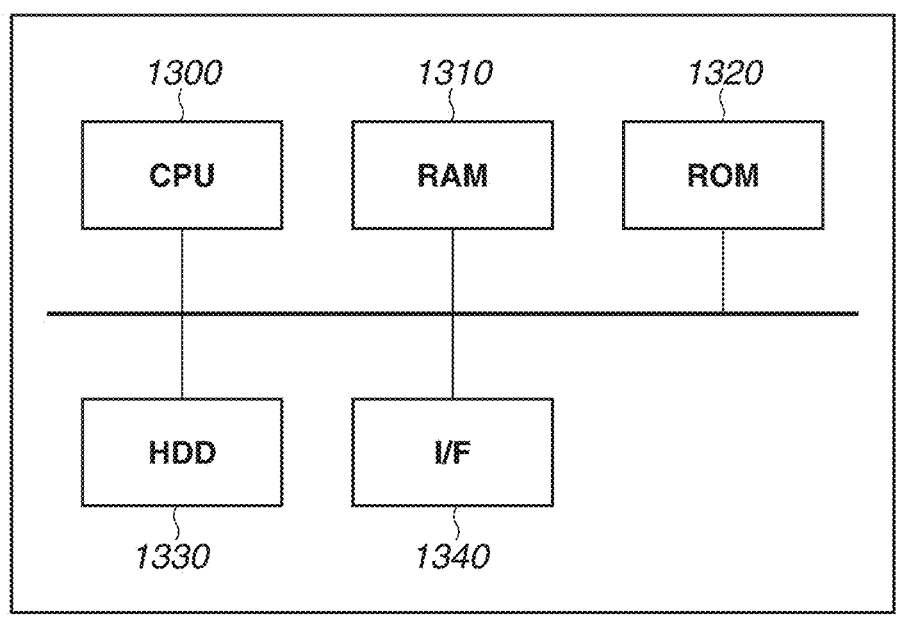
FIG. 13 is a diagram illustrating a hardware configuration of each apparatus.

The communication unit 116 communicates with the information processing apparatus 200 via an interface (I/F) 1340 to be described below with reference to FIG. 13. For example, the communication unit 116 transmits image data of an image captured by the imaging apparatus 100 to the information processing apparatus 200 via the network 300.

The communication unit 116 also transmits information indicating the current imaging range of the imaging apparatus 100. Further, the communication unit 116 receives a control command, which is a command for controlling the imaging apparatus 100, transmitted from the information processing apparatus 200, and conveys the received control command to the system control unit 114.

The system control unit 114 controls the entire imaging apparatus 100 based on processing executed by the CPU 1300, which will be described below with reference to FIG. 13, and performs, for example, the following processing. Specifically, the system control unit 114 analyzes the control command for controlling the imaging apparatus 100 transmitted from the information processing apparatus 200, and performs processing corresponding to the analyzed control command. Further, based on the position of the tracking target detected by the image analysis unit 113 in the image, the system control unit 114 calculates a change amount for each of a pan value, a tilt value, and a zoom value so that the tracking target appears in a predefined size at a central position of a captured image. It is not necessary to always calculate the change amounts for all of the pan value, the tilt value, and the zoom value. The change amount for one of these values can be calculated, or the change amount for each of two of these values can be calculated, depending on the situation. Subsequently, in the case of calculating the change amount for the pan value, the system control unit 114 instructs the pan/tilt/zoom control unit 115 to change the pan value of the imaging apparatus 100 by the calculated change amount for the pan value. In the case of calculating the change amount for the tilt value, the system control unit 114 instructs the pan/tilt/zoom control unit 115 to change the tilt value of the imaging apparatus 100 by the calculated change amount for the tilt value. In the case of calculating the change amount for the zoom value, the system control unit 114 instructs the pan/tilt/zoom control unit 115 to change the zoom value of the imaging apparatus 100 by the calculated change amount for the zoom value. This makes it possible for the imaging apparatus 100 to track the tracking target and capture an image of the tracking target.

However, depending on the motion of the tracking target, the image analysis unit 113 cannot detect the tracking target from the captured image, so that keeping track of the tracking target can fail. In a case where tracking of the tracking target is lost (i.e., in a case where keeping track of the tracking target has failed), the system control unit 114 performs a search by controlling pan, tilt, and zoom to sequentially capture images in a set search area, and resumes the tracking in a case where the tracking target is rediscovered.

The imaging range in the present embodiment is determined by the pan value, the tilt value, and the zoom value of the imaging apparatus 100. The pan value is, for example, an angle of the imaging direction (optical axis) in the pan direction 105 of the imaging apparatus 100 when one of drive ends of the pan driving unit 103 is 0°. The tilt value is, for example, an angle of the imaging direction (optical axis) in the tilt direction 106 of the imaging apparatus 100 when one of drive ends of the tilt driving unit 104 is 0°. The zoom value of the imaging apparatus 100 when an image is captured by the imaging apparatus 100 is calculated from the focal length of the lens 101.

Now, information processing by the information processing apparatus 200 according to the present embodiment will be described with reference to the functional blocks of the information processing apparatus 200 illustrated in FIG. 3. Each function of the information processing apparatus 200 is implemented as follows, using the ROM 1320 and the CPU 1300 to be described with reference to FIG. 13. In other words, each function illustrated in FIG. 3 is implemented by the CPU 1300 of the information processing apparatus 200 executing a computer program stored in the ROM 1320 of the information processing apparatus 200.

Figure 4:
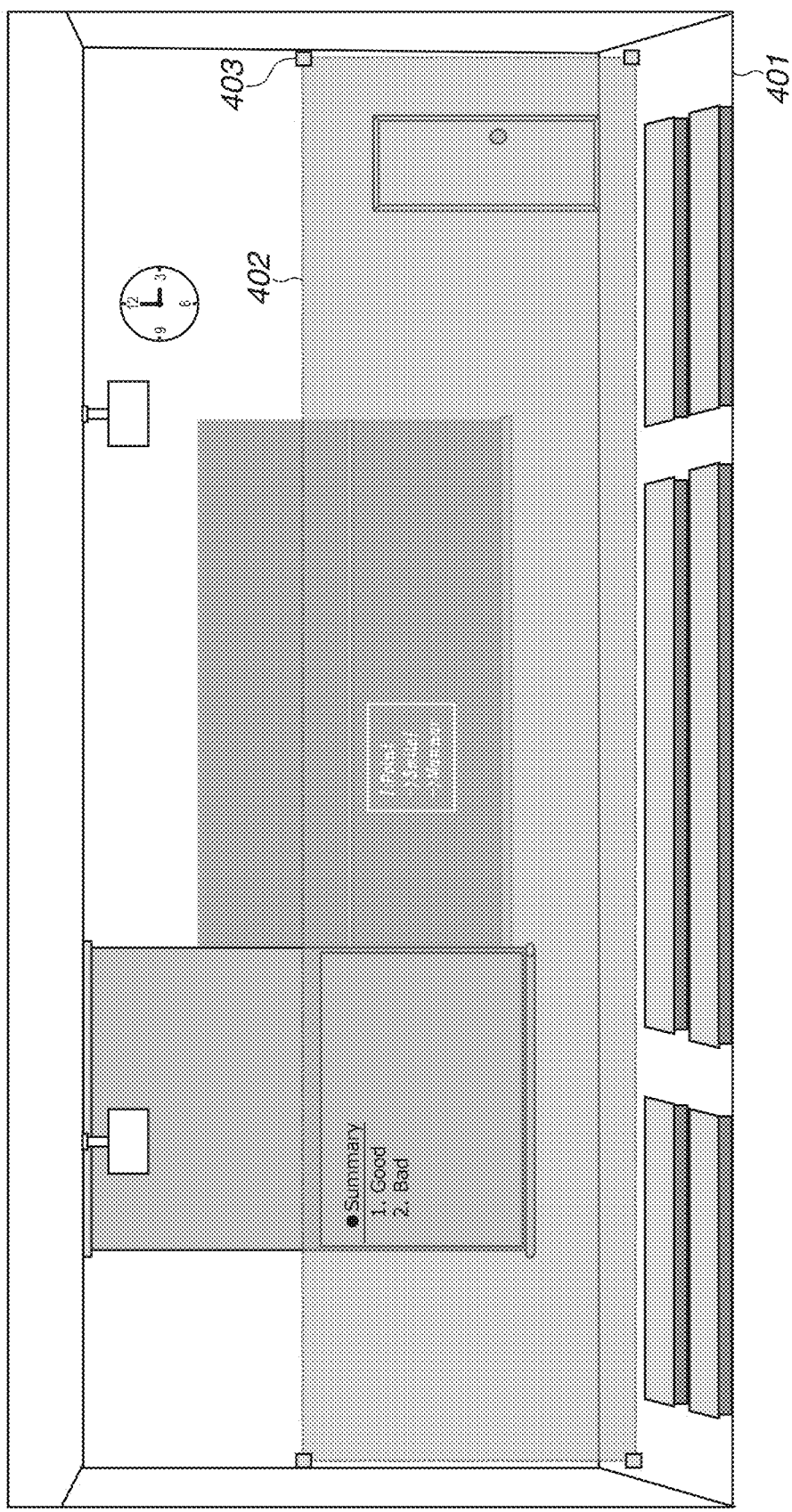
FIG. 4 is a diagram illustrating search processing.

A display control unit 201 displays an image captured by the imaging apparatus 100 and a graphical user interface (GUI) for setting a shot function, on the display 210. An operation accepting unit 202 accepts information representing an operation by a user, via an input device (not illustrated) such as a keyboard, a mouse, or a touch panel. An input portion may be a button, a mouse, a joystick, or the like that receives various operations from the user. Here, for example, the display control unit 201 displays a GUI for setting a search area on the display 210, and the operation accepting unit 202 accepts information representing a user operation on the GUI displayed on the display 210. A system control unit 203 transmits a control command to the imaging apparatus 100 via a communication unit 204 in response to the operation by the user. Here, an example of the method of setting the search area will be described with reference to FIG. 4. A wide-angle image 401 illustrated in FIG. 4 is an image captured in a state where the imaging apparatus 100 is in a wide-angle state (i.e., in a state where the zoom is in a wide end state). In place of the wide-angle image 401, a panoramic image based on a plurality of images obtained by sequentially imaging the imaging range of the imaging apparatus 100 while changing the imaging range may be displayed. The wide-angle image 401 illustrated in FIG. 4 is displayed on the display 210 by the display control unit 201. A search area 402 superimposed on the wide-angle image 401 indicates a search area currently set based on a user operation. An icon 403 is displayed at each of the four corners of the search area 402, and the search area 402 can be changed based on a user operation of dragging the icon 403 with a mouse. Information about the search area 402 set based on the user operation of dragging the icon 403 is transmitted to the imaging apparatus 100, and the system control unit 114 of the imaging apparatus 100 sets the search area 402 based on the transmitted information as a search area to be used for search processing to be described below.

The communication unit 204 transmits various setting commands and a control command for controlling the imaging apparatus 100 from the system control unit 203 to the imaging apparatus 100, via the I/F 1340 to be described below with reference to FIG. 13. In addition, the communication unit 204 receives image data transmitted from the imaging apparatus 100, and a response from the imaging apparatus 100 to a command transmitted from the information processing apparatus 200 to the imaging apparatus 100, and transmits the received image data and the response to the system control unit 203. The communication unit 204 also transmits information about the currently set search area to the imaging apparatus 100. The imaging apparatus 100 acquires the information about the search area transmitted from the information processing apparatus 200, and sets the search area as a search area to be used in the search processing to be described below. A storage unit 205 stores information about a search area, image data of an image acquired by the communication unit 204, and the like.

The system control unit 203 generates various setting commands based on user operations accepted by the operation accepting unit 202 and control commands, and transmits the generated setting commands and control commands to the imaging apparatus 100 via the communication unit 204.

Figure 5:
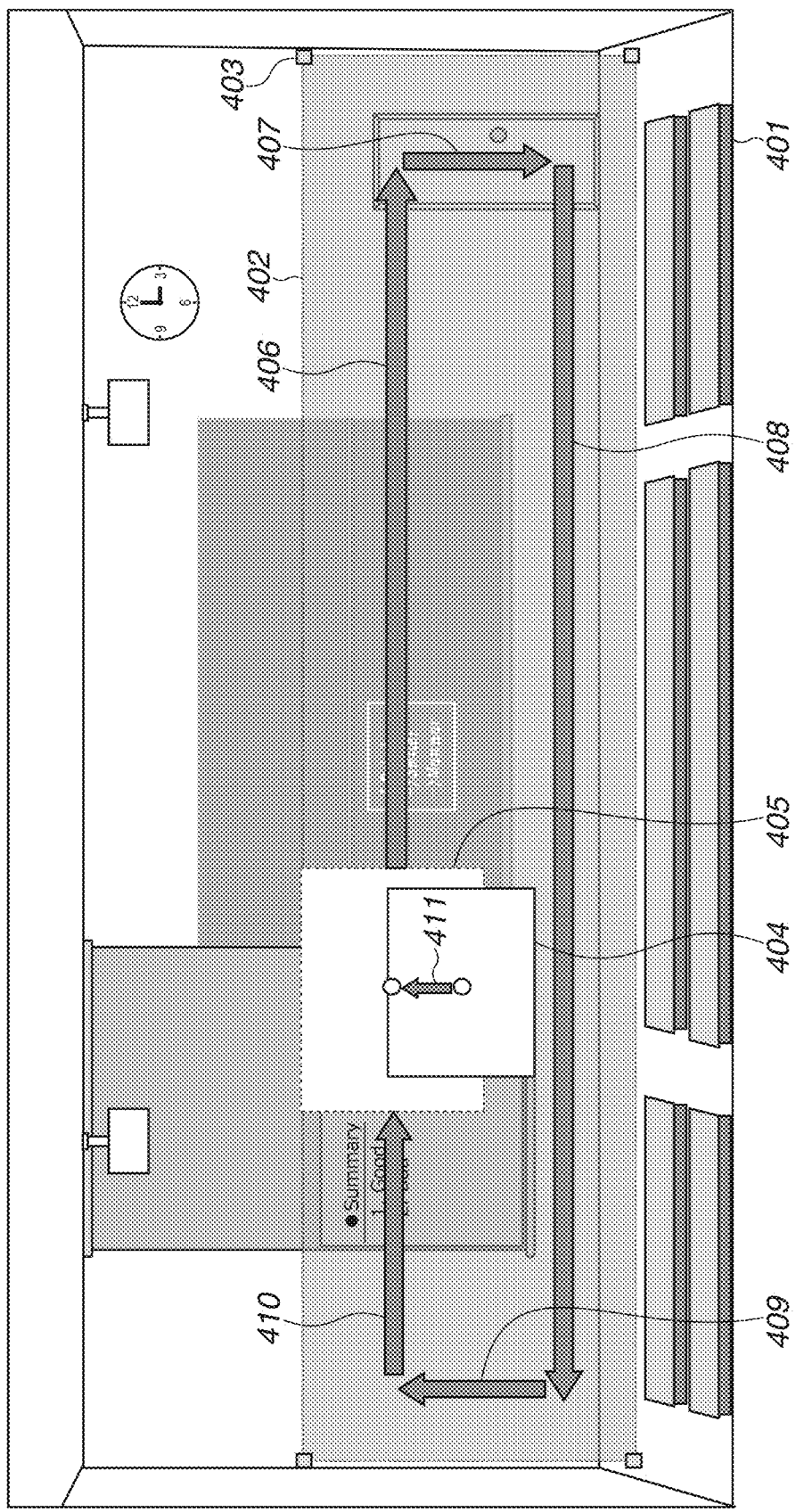
FIG. 5 is a diagram illustrating search processing.

Here, processing for calculating, based on the current imaging range and search area of the imaging apparatus 100, a route (a search route) in the search processing to be executed in a case where keeping track of a subject has failed will be described with reference to FIG. 5. An imaging range 404 illustrated in FIG. 5 is the current imaging range of the imaging apparatus 100. In a case where keeping track of the subject has failed, the system control unit 114 of the imaging apparatus 100 calculates the first search route for controlling pan, tilt, and zoom to change the imaging range to an initial range 405 based on the search area 402 acquired from the information processing apparatus 200. After zooming out in a range in which the tracking target can be detected, the system control unit 114 determines the initial range that touches a border that is the closest to the current imaging range 404 among the upper border, the lower border, the left border, and the right border of the search area 402 by changing the pan value or the tilt value. In the example illustrated in FIG. 5, the upper border of the search area 402 is the closest to the current imaging range 404, and thus the initial range 405 illustrated in FIG. 5 is selected. A route 411 is a route for moving from the current imaging range 404 to the initial range 405 thus determined. Next, the system control unit 114 identifies a border that is the farthest from the initial range 405 between the left border and the right border of the search area 402, and changes the pan value to control the imaging range so that the identified border and the border of the imaging range touch each other. A route 406 is a route thus determined by the system control unit 114. Subsequently, the system control unit 114 similarly controls the imaging range in a route 407 in which the right border of the imaging range touches the right border of the search area 402, and the lower border of the imaging range arrives at the lower border of the search area 402. In a case where the imaging range is controlled along the route 407, the system control unit 114 changes the tilt value. Subsequently, the system control unit 114 controls the imaging range in a route 408 for a movement in which the lower border of the search area 402 and the lower border of the imaging range touch each other, and the left border of the imaging range arrives at the left border of the search area 402. In the route 408, the system control unit 114 changes the pan value. Subsequently, the system control unit 114 controls the imaging range in a route 409 in which the imaging range touches the left border of the search area 402, and the upper border of the imaging range arrives at the upper border of the search area 402. In this control, the system control unit 114 changes the tilt value. Subsequently, the system control unit 114 controls the imaging range in a route 410 in which the upper border of the imaging range touches the upper border of the search area 402, and the imaging range arrives at the initial range 405. In this control, the system control unit 114 issues an instruction to change the pan value to the pan/tilt/zoom control unit 115. The system control unit 114 controls the imaging range using the search route consisting of the above-described routes 406 to 410, and the image analysis unit 113 executes processing for detecting the tracking target from images sequentially captured in the meantime. The search operation ends when the tracking target is detected, and the tracking of the tracking target resumes. The image analysis unit 113 may detect a specific human figure registered as the tracking target using feature data of images of facial parts by matching, and the tracking operation may be resumed only when there is a match.

The above example of the search is an example in a case where the size of the imaging range in the longitudinal direction at a zoom magnification in searching for the tracking target is larger than or equal to a half of the size of the search area 402 in the longitudinal direction. In a case where the size of the search area 402 in the longitudinal direction is larger, the system control unit 114 repeats reciprocating from the left end to the right end of the search area 402 while changing the tilt value, thereby determining a search route to search the entire search area 402.

Figure 6:
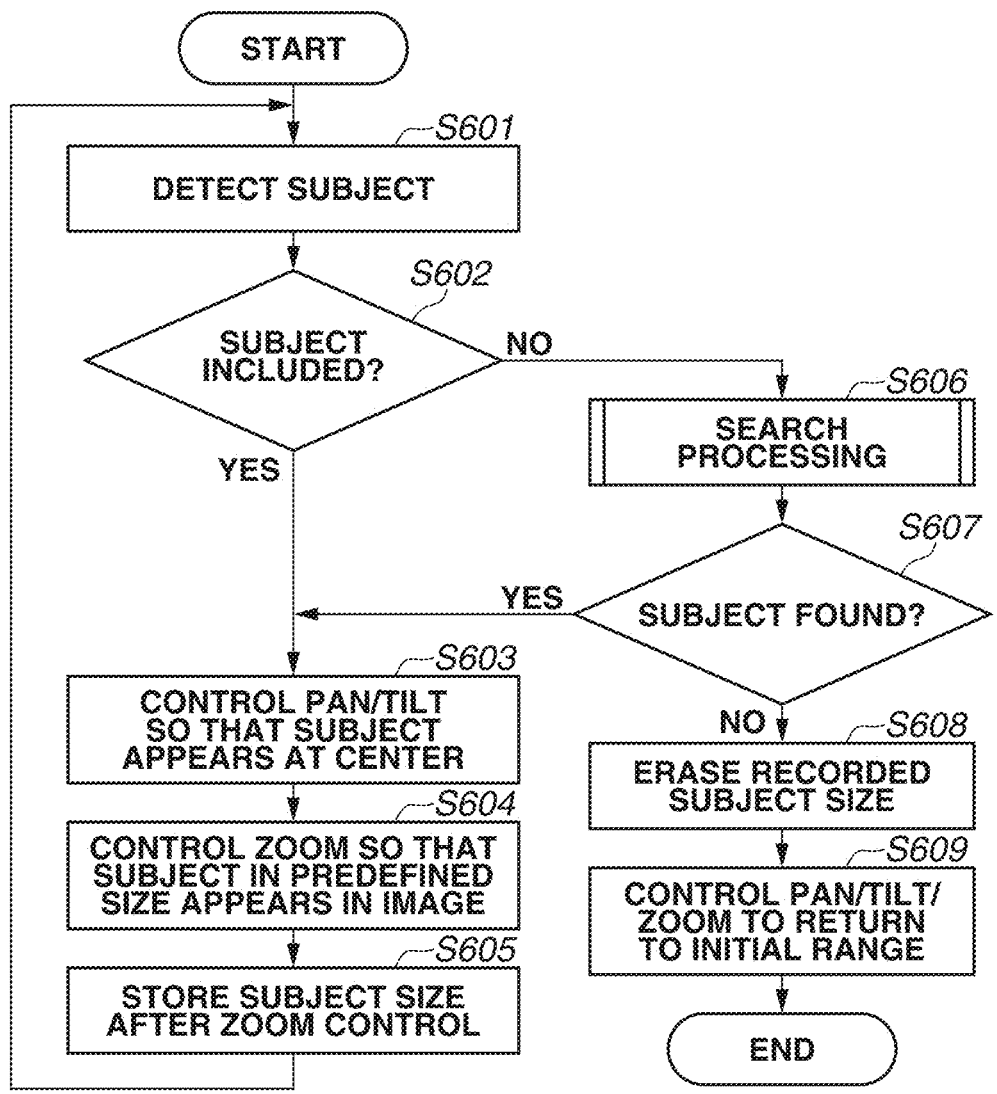
FIG. 6 is a flowchart illustrating a procedure of tracking processing.

Now, processing in a case where the imaging apparatus 100 tracks the tracking target and captures an image of the tracking target will be described with reference to a flowchart illustrated in FIG. 6. None of the pan, tilt, and zoom of the imaging apparatus 100 is driven at the time when processing in the flowchart in FIG. 6 begins. The processing in the flowchart illustrated in FIG. 6 is executed by each of the functional blocks illustrated in FIG. 3 that are each implemented by the CPU 1300 of the imaging apparatus 100 executing a computer program stored in the ROM 1320 of the imaging apparatus 100.

First, in step S601, the image analysis unit 113 detects a subject to be a tracking target from the image of the latest frame. Next, in step S602, the image analysis unit 113 determines whether the subject as the tracking target is included in the image. In a case where the subject as the tracking target is included (YES in step S602), the processing proceeds to step S603. In a case where the subject is not included (NO in step S602), the processing proceeds to step S606. The image analysis unit 113 may determine only a subject appearing in a predetermined area in the image as the tracking target. The image analysis unit 113 may perform matching to find a specific human figure registered as a tracking target using feature data of images of facial parts, and determine only a subject determined as the specific human figure as the tracking target.

In step S603, based on at least one of the current pan value and tilt value, and the position of the tracking target detected by the image analysis unit 113 in the image, the system control unit 114 calculates a change amount for the current pan value and/or tilt value so that the tracking target appears at a central position of the image.

Subsequently, the system control unit 114 instructs the pan/tilt/zoom control unit 115 to change the current pan value and/or tilt value by the calculated change amount for the pan value and/or tilt value. The pan/tilt/zoom control unit 115 thereby controls the pan driving unit 103 and/or the tilt driving unit 104 to change the current pan value and/or tilt value by the change amount as instructed by the system control unit 114.

Then, in step S604, the system control unit 114 determines a change amount for the zoom value so that the tracking target in a predefined size appears in the image. For example, at first, the system control unit 114 determines whether the size of the tracking target in the image is appropriate with respect to the size of the image. For example, the system control unit 114 determines whether the ratio of the number of pixels in the longitudinal direction of the circumscribed rectangle of the tracking target to the number of pixels in the longitudinal direction of the captured image exceeds a first ratio (e.g., 80%). As a result, in a case where the ratio of the number of pixels in the longitudinal direction of the circumscribed rectangle of the tracking target to the number of pixels in the longitudinal direction of the captured image exceeds the first ratio, the system control unit 114 determines that it is desirable to zoom out so that the ratio becomes less than a second ratio. Further, the system control unit 114 determines whether the ratio of the number of pixels in the longitudinal direction of the circumscribed rectangle of the tracking target to the number of pixels in the longitudinal direction of the captured image is less than the second ratio (e.g., 50%). Here, in a case where the ratio of the number of pixels in the longitudinal direction of the circumscribed rectangle of the tracking target to the number of pixels in the longitudinal direction of the captured image is less than the second ratio, the system control unit 114 determines that it is desirable to zoom in so that the ratio becomes more than or equal to the second ratio. Here, the system control unit 114 may allow the user to set the first ratio and the second ratio beforehand.

Subsequently, the system control unit 114 instructs the pan/tilt/zoom control unit 115 to change the current zoom value of the imaging apparatus 100 by the determined change amount for the zoom value. The pan/tilt/zoom control unit 115 controls the lens driving unit 102 to change the zoom value by the change amount instructed by the system control unit 114.

Then, in step S605, the system control unit 114 determines the size of the tracking target in a captured video image after the zoom control based on the size of the tracking target detected in step S601 and the change amount for the zoom value in step S604. For example, suppose zoom-in is performed in step S604, and the change amount for the zoom value at this moment is 1.5 times. In this case, if the size of the tracking target in the longitudinal direction before the zoom-in is 40% of the size of the captured image in the longitudinal direction, the height of the tracking target in the captured image after the zoom-in is 60% of the size of the image in the longitudinal direction. Further, suppose zoom-out is performed in step S604, and the change amount for the zoom value at this moment is a value for enlarging an angle of view to 150% in length and breadth. In this case, if the size of the tracking target in the longitudinal direction before the zoom-out is 90% of the size of the captured image in the longitudinal direction, the size of the tracking target in the longitudinal direction in the captured image after the zoom-out is 60% of the size of the captured image in the longitudinal direction.

Subsequently, the system control unit 114 stores the thus determined size of the tracking target in the captured image after the zoom control into a memory of the system control unit 114 or an external memory (not illustrated). After step S605, the processing returns to step S601.

In step S606, in a case where the state of detecting the tracking target is changed to the state of not detecting the tracking target (in a case where keeping track of the tracking target has failed), the system control unit 114 executes processing (search processing) of searching for the lost tracking target. The processing in step S606 will be described in detail below with reference to a flow in FIG. 7.

In step S607, the system control unit 114 determines whether the tracking target is detected (found) by the image analysis unit 113 from the image by the search processing, and in a case where the tracking target is detected (YES in step S607), the processing proceeds to step S603. On the other hand, in a case where the tracking target is not detected by the image analysis unit 113 from the image by the search processing (NO in step S607), the processing proceeds to step S608.

In step S608, the system control unit 114 erases the size of the tracking target recorded in the memory. In step S609, the system control unit 114 instructs the pan/tilt/zoom control unit 115 to change the current values to the pan value, the tilt value, and the zoom value of the initial imaging range set beforehand.

Here, the search processing in step S606 will be described in detail with reference to FIG. 7. Processing in a flowchart illustrated in FIG. 7 is executed by each of the functional blocks illustrated in FIG. 3 that are each implemented by the CPU 1300 of the imaging apparatus 100 executing a computer program stored in the ROM 1320 of the imaging apparatus 100.

In step S701, the image analysis unit 113 executes detection processing for detecting the tracking target from the captured image for a predetermined time. The predetermined time may be the number of seconds set beforehand by the user.

Figure 7:
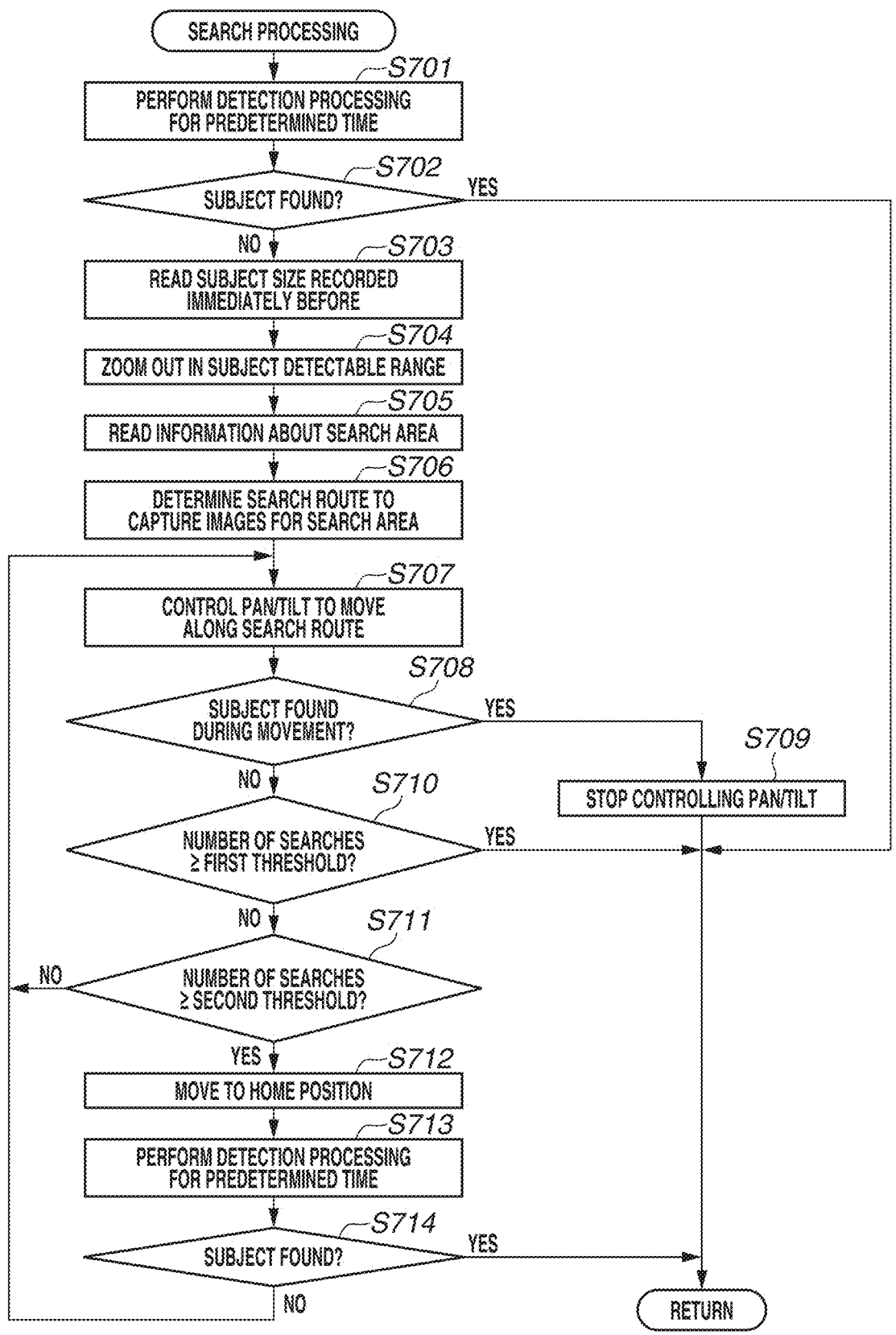
FIG. 7 is a flowchart illustrating a procedure of search processing.

Next, in step S702, the image analysis unit 113 determines whether the tracking target is detected (found) by the image analysis unit 113, and in a case where the tracking target is detected (YES in step 702), the subject search processing illustrated in FIG. 7 ends, and the processing proceeds to step S607. On the other hand, in a case where the tracking target is not detected by the image analysis unit 113 (NO in step S702), the processing proceeds to step S703.

In step S703, the image analysis unit 113 reads the size recorded in the memory in step S605, i.e., the size of the tracking target on the image immediately before track of the tracking target is lost. Then, in step S704, the image analysis unit 113 performs the following processing. Suppose the tracking target having the size read in step S703 appears on the image of the current frame. The image analysis unit 113 calculates to what degree zoom-out can be performed in a range of zoom values by which the tracking target can be detected in this state. For example, the image analysis unit 113 determines that highly accurate detection is possible if the size of the tracking target in the longitudinal direction detected from the image is larger than or equal to 30% of the size of the image in the longitudinal direction, and this is determined as a minimum detection size. In this process, if zoom-out is performed so that the tracking target having the height of the same size as the minimum detection size appears, detecting the tracking target fails when the tracking target becomes smaller than the minimum detection size in a case where the tracking target moves away from the imaging apparatus 100. Thus, the system control unit 114 calculates a zoom-out amount so that the tracking target appears in a size equal to 36%, which is 1.2 times the minimum detection size. Further, the system control unit 114 instructs the pan/tilt/zoom control unit 115 to zoom out by the calculated zoom-out amount, so that the lens driving unit 102 performs the zoom-out.

In step S705, the system control unit 114 reads position information about the search area transmitted from the information processing apparatus 200 from a memory or the like. The position information about the search area has been transmitted from the information processing apparatus 200 to the imaging apparatus 100 and stored in a memory of the imaging apparatus 100 beforehand.

In step S706, the system control unit 114 determines a search route for controlling the pan/tilt to sequentially capture images in the search area in the shortest path based on the current imaging range and the set search area.

In step S707, the system control unit 114 instructs the pan/tilt/zoom control unit 115 to control the imaging range along the search route determined in step S706. The pan/tilt/zoom control unit 115 thereby controls the pan driving unit 103 and/or the tilt driving unit 104 to control the imaging range to be along the search route. In the example illustrated in FIG. 5, the imaging range is controlled starting from the initial range 405 along the search route consisting of the routes 406 to 410.

In step S708, whether the tracking target (the subject) is detected by the image analysis unit 113 during the movement is determined. In a case where the tracking target is detected by the image analysis unit 113 from the captured image in the process of controlling the imaging range along the search route in step S707 (YES in step S708), the processing proceeds to step S709. On the other hand, in a case where the tracking target is not detected by the image analysis unit 113 from the captured image in the process of controlling the imaging range along the search route (NO in step S708), the processing proceeds to step S710.

In step S709, the system control unit 114 instructs the pan/tilt/zoom control unit 115 to stop the control of the imaging range along the search route in step S707. After step S709, the processing proceeds to step S607 illustrated in FIG. 6. In step S710, the system control unit 114 determines whether the number of times the processing (the processing of controlling the imaging range along the search route) in step S707 has been performed is more than or equal to a first threshold (a threshold for giving up the search processing and stopping the search processing). In a case where the number of times the processing in step S707 has been performed is more than or equal to the first threshold (YES in step S710), the search processing ends, and the processing proceeds to step S607. In a case where the number of times the processing (the processing of controlling the imaging range along the search route) in step S707 has been performed is less than the first threshold (NO in step S710), the processing proceeds to step S711.

In step S711, the system control unit 114 determines whether the number of times the processing (the processing of controlling the imaging range along the search route) in step S707 has been performed is more than or equal to a second threshold (a threshold for suspending the search and returning to a home position). In a case where the number of times is determined to be more than or equal to the second threshold (YES in step S711), the processing proceeds to step S712 to temporarily return the imaging range to the home position. On the other hand, in a case where the number of times is determined to be less than the second threshold (NO in step S711), the processing returns to step S707, so that the processing of controlling the imaging range along the search route is executed again. At this moment, a count value of the number of times the processing in step S707 has been executed is incremented by 1.

In step S712, the system control unit 114 instructs the pan/tilt/zoom control unit 115 to move to the home position (the initial imaging range) determined by the pan value, the tilt value, and the zoom value set beforehand by the user. Here, the home position may be set beforehand by the user, or a range in which the tracking target is likely to be present may be calculated from a movement history up to this point of the tracking target, and an angle of view for capturing the calculated range may be determined as the home position.

In step S713, the image analysis unit 113 performs the detection processing for detecting the tracking target on images sequentially captured for a predetermined time. In step S714, whether the tracking target is detected by the image analysis unit 113 is determined, and if the tracking target is detected (YES in step S714), the subject search processing ends, and the processing proceeds to step S607 illustrated in FIG. 6. On the other hand, in a case where the tracking target is not detected by the image analysis unit 113 (NO in step S714), the processing proceeds to step S707, so that the processing of controlling the imaging range along the search route is executed again to search for the tracking target again. At this moment, the count value of the number of times the processing in step S707 has been executed is incremented by 1.

As described above, the imaging apparatus 100 according to the present embodiment executes the processing of searching for the tracking target while controlling the imaging range for the entire search area set by the user as the range in which the tracking target can be present in a case where detection of the tracking target has failed. This can increase the possibility of discovering the tracking target again even in a case where keeping track of the tracking target has failed.

In a second embodiment, in a case where keeping track of a tracking target has failed, the tracking target is searched for by sequentially capturing images by pan/tilt/zoom control in a set search area, in a manner similar to the first embodiment. After that, the tracking target found by the search is tracked and imaged. In addition, in the present embodiment, the search area is updated to include a position of the tracking target detected outside the search area in a case where the tracking target has been tracked in a place outside the set search area during tracking of the tracking target. This makes it possible to include all the places where the tracking target has been present in the past in the search area, thereby making it easy to search a place where the tracking target is likely to be present during a subject search. Moreover, the search area can be appropriately updated as a range where the subject can be present even in a case where a user cannot accurately set the search area. A part different from the first embodiment will be mainly described below. Components and processes identical or equivalent to those of the first embodiments are assigned the same reference numerals as those of the first embodiment, and the description thereof will be omitted.

Figure 8:
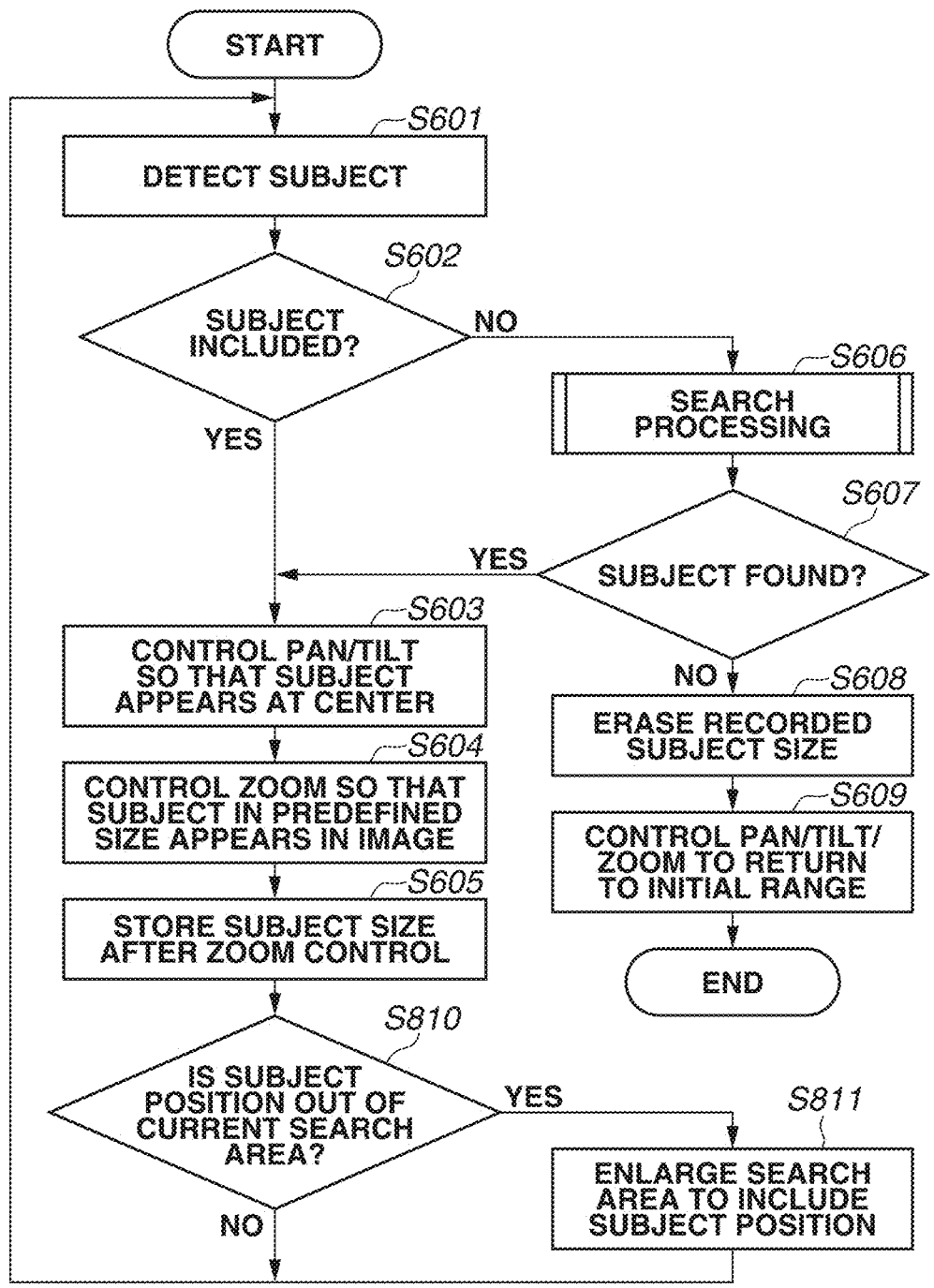
FIG. 8 is a flowchart illustrating a procedure of search area setting processing.

Here, tracking imaging operation for the tracking target by an imaging apparatus 100 will be described with reference to a flowchart in FIG. 8. Processing in a flowchart illustrated in FIG. 8 is executed by each of functional blocks illustrated in FIG. 3 that are each implemented by a CPU 1300 of the imaging apparatus 100 executing a computer program stored in a ROM 1320 of the imaging apparatus 100. Step S601 to step S609 in FIG. 8 are similar to those described with reference to FIG. 6 in the first embodiment, and thus the description thereof will be omitted.

In step S810, a system control unit 114 determines whether the position of the tracking target detected by an image analysis unit 113 is out of the currently set search area. In a case where it is determined that the position of the detected tracking target is out of the search area (YES in step S810), the operation proceeds to step S811 to enlarge the search area. On the other hand, in a case where the position of the detected tracking target is within the currently set search area (NO in step S810), the operation returns to step S601.

Figure 9:
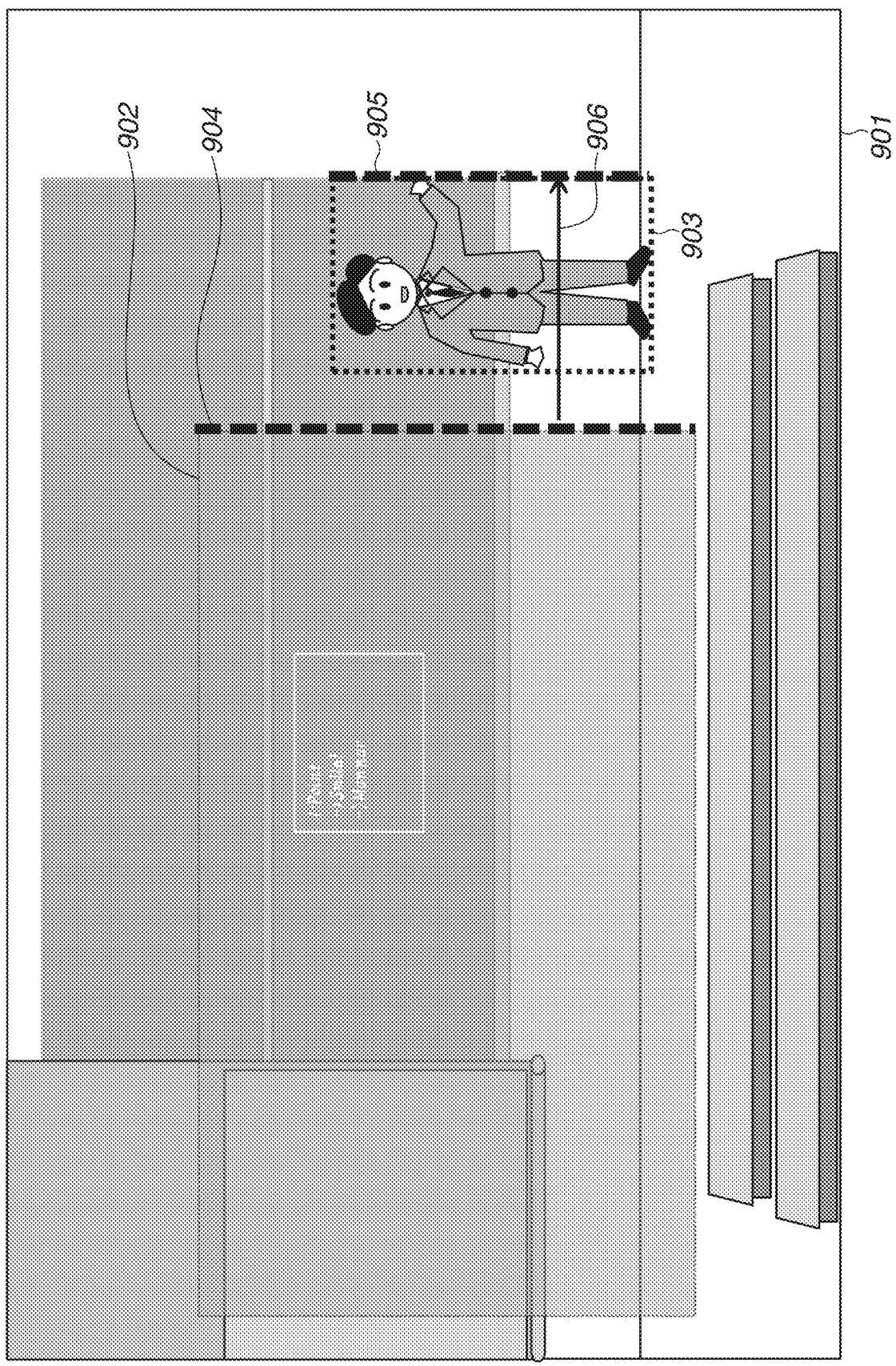
FIG. 9 is a diagram illustrating search area setting processing.

In step S811, the system control unit 114 updates the setting of the search area to include the current position of the tracking target. Here, processing of updating the search area will be described with reference to FIG. 9. An imaging range 901 is the current imaging range of the imaging apparatus 100, and a search area 902 is the currently set search area. A circumscribed rectangle 903 is the circumscribed rectangle of a human figure detected by the image analysis unit 113 as the tracking target, and indicates the position of the human figure. In the example illustrated in FIG. 9, the circumscribed rectangle 903 of the tracking target is present outside the search area 902. In this case, the system control unit 114 updates the search area 902 to include the circumscribed rectangle 903 located outside the search area 902. Specifically, a border 905, which is the right border of the circumscribed rectangle 903, is located to the right of a border 904, which is the right border of the search area 902, and thus the system control unit 114 determines that it is necessary to enlarge the search area 902 in the right direction. In this case, the system control unit 114 enlarges the search area 902 by moving the position of the right border 904 of the search area 902 to the position of the right border 905 of the circumscribed rectangle 903 so that the search area 902 contains the circumscribed rectangle 903. A range of enlargement in this process corresponds to a direction and a distance indicated by an arrow 906. While the case where the range is enlarged in the right direction is described as an example, the system control unit 114 enlarges the search area 902 by moving the left border of the search area 902 in the left direction in a case where the left border of the circumscribed rectangle 903 is located to the left of the left border of the search area 902. Similarly, the system control unit 114 enlarges the search area in the upper direction based on a comparison between the upper borders, and in the lower direction based on a comparison between the lower borders.

The above-described operation makes it possible to enlarge the search area to contain the current position of the tracking target and thereby update the setting. The system control unit 114 may transmit information about the updated search area to an information processing apparatus 200, and a display control unit 201 of the information processing apparatus 200 may superimpose the updated search area on a wide-angle image 401 and display the resultant image on a display 210.

In this way, in the present embodiment, it is possible to include all the areas where the tracking target has been present in the past in the search area when performing a search using pan/tilt/zoom driving for the entire range where the target can be present, in a case where detection of the tracking target has failed. This increases the possibility that an area where the tracking target is present can be searched.

In a third embodiment, a search area is automatically set from a trail of pan/tilt/zoom control manually operated by a user. The search area can be thereby set in a simplified manner. A part different from the first embodiment will be mainly described. Components and processes identical or equivalent to those of the first embodiments are assigned the same reference numerals as those of the first embodiment, and the description thereof will be omitted. In particular, processing of controlling an imaging range while tracking a tracking target and search processing in a case where keeping track of the tracking target has failed are similar to those in the first embodiment, and thus the description thereof will be omitted.

Figure 10:
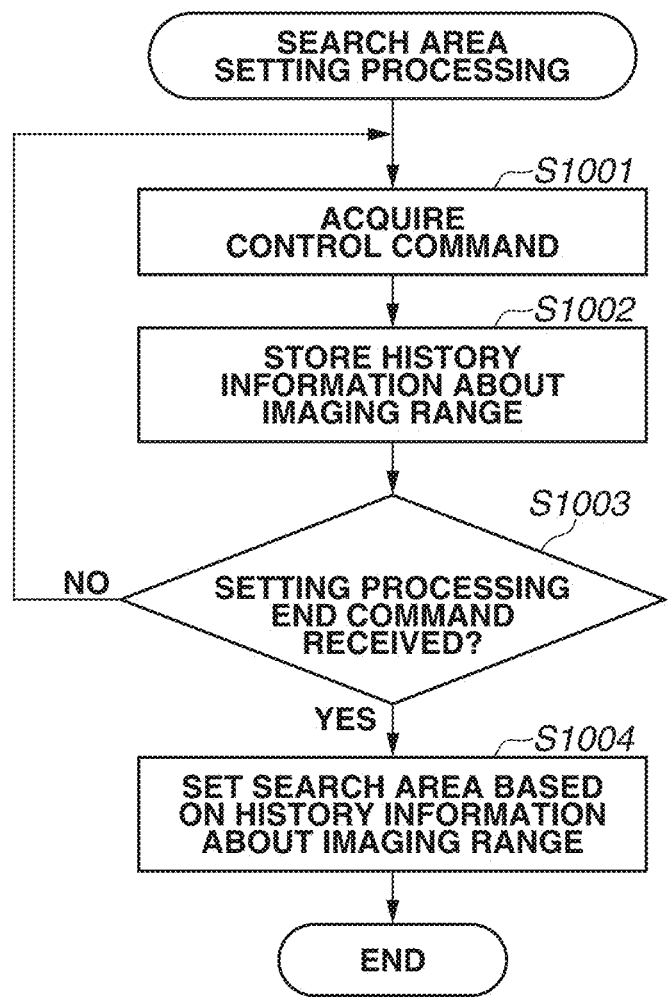
FIG. 10 is a flowchart illustrating a procedure of search area setting processing.

In the present embodiment, search area setting processing is executed before start of processing similar to the processing of the flowchart illustrated in FIG. 6 in the first embodiment. A system control unit 114 starts the search area setting processing upon receiving a request command for setting the search area from an information processing apparatus 200 based on a user operation. Here, the search area setting processing will be described with reference to a flowchart illustrated in FIG. 10. The processing in the flowchart illustrated in FIG. 10 is executed by each of functional blocks illustrated in FIG. 3 that are each implemented by a CPU 1300 of the imaging apparatus 100 executing a computer program stored in a ROM 1320 of an imaging apparatus 100.

First, in step S1001, the system control unit 114 acquires a control command for controlling at least one of a pan value, a tilt value, and a zoom value (i.e., a control command for controlling an imaging range) transmitted from the information processing apparatus 200. An operation accepting unit 202 accepts a user operation for changing the pan value, the tilt value, and the zoom value, and in response to the acceptance, a system control unit 203 of the information processing apparatus 200 executes the following processing. Specifically, the system control unit 203 generates a control command for changing the current values to a pan value, a tilt value, and/or a zoom value requested by an instruction from the user, and the generated control command is transmitted to the imaging apparatus 100. In step S1001, the system control unit 114 acquires the control command thus transmitted. The system control unit 114 instructs a pan/tilt/zoom control unit 115 to change the current values to the pan value, the tilt value, and/or the zoom value requested by the instruction from the user based on the acquired control command. The pan/tilt/zoom control unit 115 controls a pan driving unit 103, a tilt driving unit 104, and/or a lens driving unit 102, based on the instruction.

In step S1002, the system control unit 114 generates history information indicating time-series transition of the pan value, the tilt value, and the zoom value of the imaging apparatus 100 by user operations, and stores the generated history information in a memory.

In step S1003, the system control unit 114 determines whether an instruction command for ending the search area setting processing is received from the information processing apparatus 200. In a case where the command is received (YES in step S1003), the processing proceeds to step S1004. In a case where the command is not received (NO in step S1003), the processing returns to step S1001.

Figure 11:
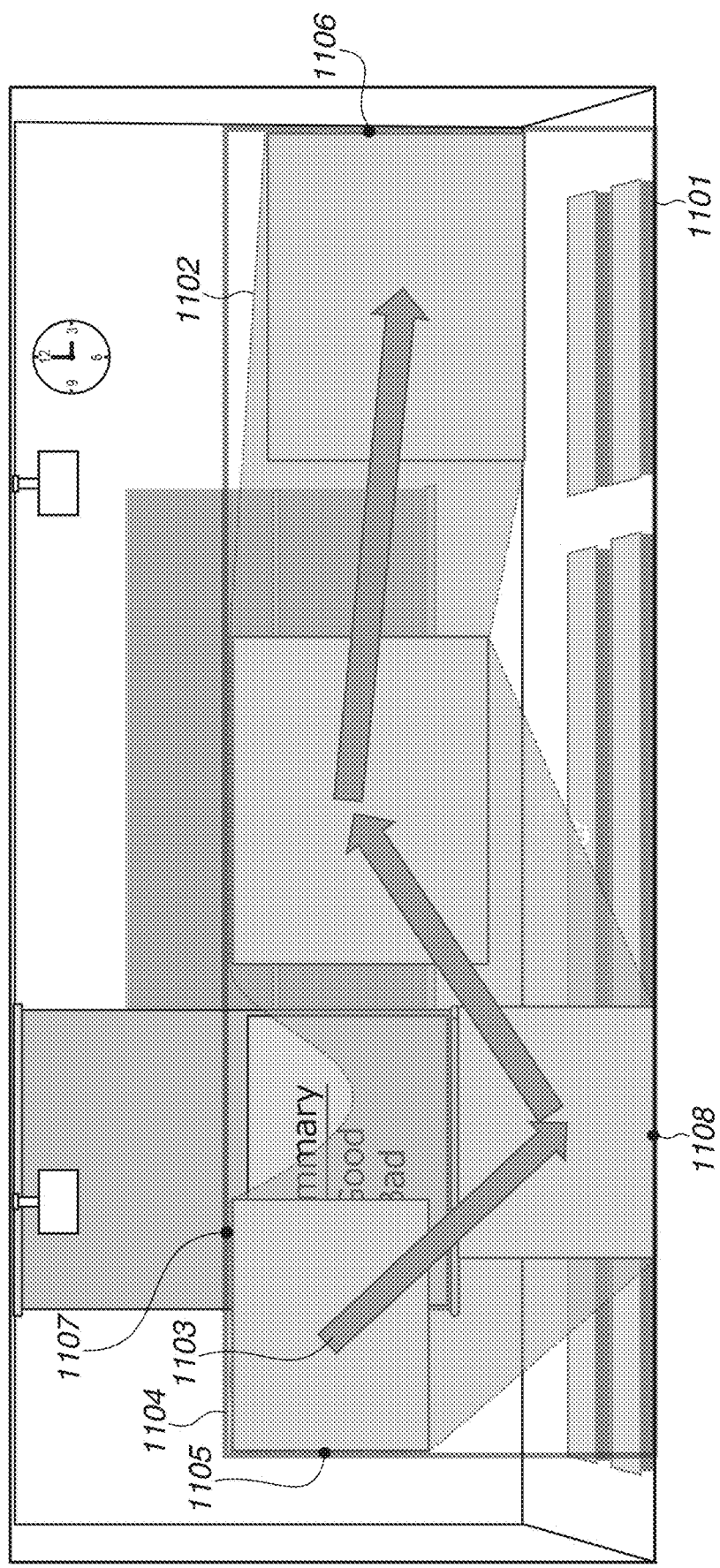
FIG. 11 is a diagram illustrating search area setting processing.

In step S1004, based on the history information indicating the transition of the pan value, the tilt value, and the zoom value stored in step S1002, the system control unit 114 sets a range that has been included at least once in the imaging range of the imaging apparatus 100 controlled by the user operation as the search area. Here, the search area setting processing will be described with reference to FIG. 11. An area 1101 indicates an imaging location, and a range 1102 indicates a range that has been included at least once in the imaging range based on the pan value, the tilt value, and the zoom value requested by the user. A trail 1103 is a trail along which the imaging range has moved by user operations.

Here, if the range 1102 is set as it is as the search area, the search area has a complicated shape, so that a search route in searching for the tracking target is complicated. Thus, a range 1104 (hereinafter referred to as a search area 1104), which is the circumscribed rectangle of the range 1102, is set as the search area. The left border of the search area 1104 is determined to pass through a point 1105, which is the left end of the range 1102. Similarly, the right border of the search area 1104 is determined to pass through a point 1106, which is the right end of the range 1102. Further, the upper border of the search area 1104 is determined to pass through a point 1107, which is the upper end of the range 1102, and the lower border of the search area 1104 is determined to pass through a point 1108, which is the lower end of the range 1102. The example in which the search area is rectangular is described above, but a search area having a complicated shape may be set, and the search area may be searched. The search route may be determined from the history information about the transition of the pan value, the tilt value, and the zoom value stored in step S1002, not by using the method illustrated in FIG. 5 of the first embodiment. In this case, the search processing is executed based on a search route along the trail 1103.

There is described the example in which the pan/tilt/zoom operation for setting is performed by the user after the imaging apparatus 100 has accepted the request for setting the search area from the information processing apparatus 200. Alternatively, history information about the transition of the pan value, the tilt value, and the zoom value by the user at the time of normal imaging may be generated, and the search area may be determined based on the history information.

As described above, the imaging apparatus 100 according to the present embodiment sets the search area for executing the search processing based on the pan/tilt/zoom operation by the user. The search area can be thereby set in a simplified manner.

In a fourth embodiment, in a case where keeping track of the tracking target has failed, images are sequentially captured in a set search area by pan/tilt/zoom control, and a tracking target is searched for, in a manner similar to the first embodiment. After that, the tracking target found by the search is tracked and imaged. Further, in addition to the first embodiment, information about a history (movement history) of the past positions of the tracking target is held in the present embodiment. In a case where detection of the tracking target has failed and a search is performed, a position where the tracking target has been frequently present in the past is searched first, thereby making it possible to increase the possibility that the tracking target is found quickly. A part different from the first embodiment will be mainly described. Components and processes identical or equivalent to those of the first embodiments are assigned the same reference numerals as those of the first embodiment, and the description thereof will be omitted.

A system control unit 114 divides the set search area evenly into a plurality of blocks.

The system control unit 114 counts a tracking-target presence time for a block including the central position of the detected tracking target based on a result of tracking target detection processing for an image by an image analysis unit 113. The system control unit 114 can thereby hold a total tracking-target presence time for each of the blocks as the movement history of the tracking target.

Figure 12:
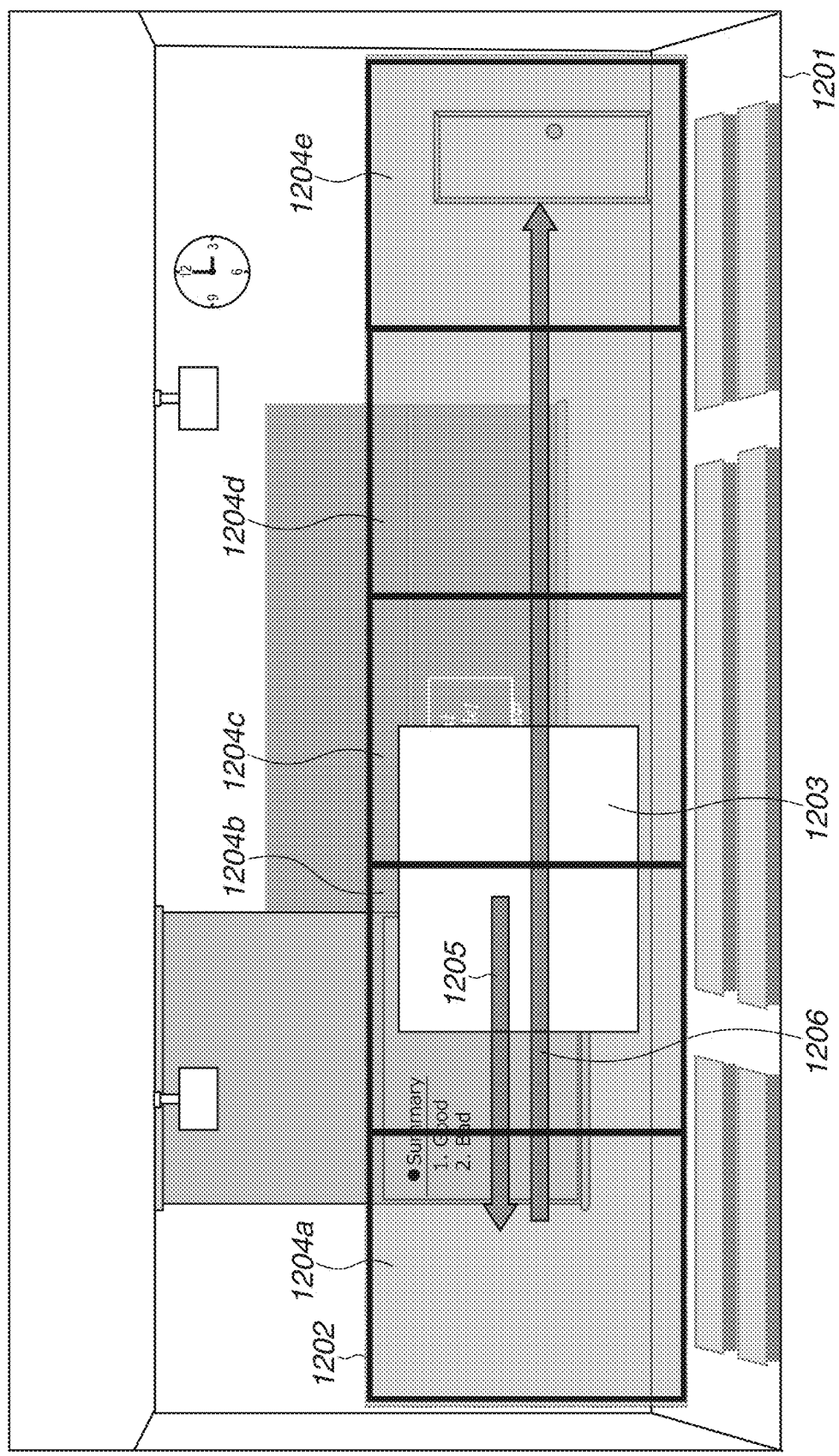
FIG. 12 is a diagram illustrating search route determination processing.

When determining a search route for the search processing to be executed in a case where keeping track of the tracking target has failed, the system control unit 114 determines a search route that first searches for a block where the tracking target has been present for a long time in the past based on the tracking-target presence time for each block in the search area. Here, operation for determining the search route will be described with reference to FIG. 12. An area 1201 indicates an environment that is an imaging target, and a search area 1202 is the currently set search area. An imaging range 1203 is an imaging range at the time of starting the search processing due to a failure in keeping track of the tracking target. The search area 1202 includes blocks 1204a to 1204e obtained by dividing the search area 1202 into five blocks laterally aligned as illustrated in FIG. 12. The system control unit 114 holds the total tracking-target presence time, which is the time during which the tracking target has been present, for each of the blocks 1204a to 1204e. Here, for example, in a case where the tracking target has been present for the longest time in the leftmost block 1204a among the blocks 1204a to 1204e, the system control unit 114 determines a search route that captures an image in the block 1204a first. A movement route in controlling the imaging range in this case is a route 1205. After that, in a case where the tracking target cannot be detected in the leftmost block 1204a, the system control unit 114 performs a search while controlling the imaging range in a movement route indicated as a route 1206 to also search the blocks on the right. In the above-described example, it is described that the block division is laterally performed, but is not limited thereto. The unit of block can be changed. For example, vertical division or division into smaller units may be adopted.

Further, in the above-described example, a search order is determined based on the tracking-target presence time in the past, but there are other methods such as a method of determining the order starting from the last position at which track of the tracking target has been lost. In this case, if the last detected position of the tracking target is on the left side of the angle of view of an imaging apparatus, the left side is searched first. The search route may be determined by setting a search priority by another method using the history of the past positions of the tracking target.

In this way, in the present embodiment, an area where the tracking target is likely to be present now is estimated from the movement history of the tracking target, and the estimated area is searched first, so that the possibility that the tracking target is found in a short time can be increased.

Now, a hardware configuration of the imaging apparatus 100 for implementing each function in each of the embodiments will be described with reference to FIG. 13. While the hardware configuration of the imaging apparatus 100 will be described below, the information processing apparatus 200 will have a similar hardware configuration.

The imaging apparatus 100 according to the present embodiment includes the CPU 1300, a random access memory (RAM) 1310, the ROM 1320, a hard disk drive (HDD) 1330, and the I/F 1340.

The CPU 1300 controls the entire imaging apparatus 100. The RAM 1310 temporarily stores a computer program to be executed by the CPU 1300. In addition, the RAM 1310 provides a work area to be used when the CPU 1300 executes processing. The RAM 1310 also functions as, for example, a frame memory, and as a buffer memory.

The ROM 1320 stores a program and the like for the CPU 1300 to control the imaging apparatus 100. The HDD 1330 is a storage device for recording image data and the like. The I/F 1340 communicates with an external apparatus using Transmission Control Protocol/Internet Protocol (TCP/IP), Hypertext Transfer Protocol (HTTP), or the like via the network 300.

In each of the above-described embodiments, the CPU 1300 is described as executing the processing, but at least part of the processing executed by the CPU 1300 may be performed by a dedicated hardware. For example, processing of reading a program code from the ROM 1320 and loading the program code into the RAM 1310 may be executed by direct memory access (DMA) that functions as a transfer apparatus.

The present invention can also be implemented by processing in which one or more processors read a program for implementing one or more functions of the above-described embodiments and execute the program. The program may be supplied to a system or apparatus having a processor via a network or storage medium.

The present invention can also be implemented by a circuit (e.g., an application specific integrated circuit (ASIC)) for implementing the one or more functions of the above-described embodiments. Each component of the imaging apparatus 100 may be implemented by the hardware illustrated in FIG. 13, or may be implemented by software.

Another apparatus may have one or more functions of the imaging apparatus 100 according to each of the above-described embodiments. For example, the information processing apparatus 200 may have one or more functions of the imaging apparatus 100 according to each of the embodiments. The above-described embodiments may be freely combined.

The present invention is described above with some embodiments, but the above-described embodiments are merely specific examples to carry out the present invention, and the technical scope of the present invention is not intended to be interpreted to a limited extent. In other words, the present invention can be implemented in various forms without departing from the technical idea or the substantial feature thereof. For example, combinations of the embodiments are also included in the disclosure of the present specification.

According to the above-described embodiments, the possibility of rediscovering the tracking target can be increased even if keeping track of the subject as the tracking target has failed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2021-194557, filed Nov. 30, 2021, which is hereby incorporated by reference herein in its entirety.

What is claimed is:

1. A control apparatus comprising:

at least one memory storing instructions; and at least one processor that, upon execution—of the instructions, is configured to operate as:

a control unit configured to change an imaging range by controlling at least one of a pan, a tilt, and a zoom for an imaging unit to track a tracking target;

a setting unit configured to set a search area based on a range set by a user, a user operation for controlling the imaging range, or a past position of the tracking target;

an update unit configured to enlarge the search area to include a detected position of the tracking target outside the search area in a case where the tracking target is detected outside the search area; and a determination unit configured to, in a case where tracking of the tracking target has failed, determine a zoom value for searching for the tracking target from a last captured image from which a subject is detected;

wherein, in the case where the tracking of the tracking target has failed, the control unit controls an imaging direction to search for the tracking target in the search area at the zoom value determined by the determination unit;

divides the search area into a plurality of blocks;

measures, for each of the plurality of blocks, a tracking-target presence time indicating a total time during which the tracking target has been present in each block;

determines a route for controlling the imaging range in the search area, the route being determined based on the tracking-target presence time for each of the blocks, so that blocks having a longer tracking-target presence time are searched first; and controls the imaging range along the determined route.

2. The control apparatus according to claim 1, wherein the setting unit acquires information about the range set by the user from an information processing apparatus, and sets the range based on the acquired information as the search area.

3. The control apparatus according to claim 1, wherein the setting unit sets the search area based on a range included in the imaging range in a process of controlling the imaging range according to the user operation.

4. The control apparatus according to claim 1,
wherein the search area is a range that is set in a wide-angle state image captured by the imaging unit or a panoramic image based on a plurality of images obtained by sequentially imaging the imaging range.

5. A control method comprising:

changing an imaging state by controlling at least one of a pan, a tilt, and a zoom for of an imaging unit to track a tracking target;

setting a search area based on a range set by a user, a user operation for controlling the imaging range, or a past position of the tracking target;

enlarging the search area to include a detected position of the tracking target outside the search area in a case where the tracking target is detected outside the search area;

determining a zoom value for searching for the tracking target from a last captured image from which a subject is detected, in a case where tracking of the tracking target has failed, wherein, in a case where the tracking of the tracking target has failed, an imaging direction is controlled to search for the tracking target in the search area at the determined zoom value, the search area is divided into a plurality of blocks, a tracking-target presence time indicating a total time during which the tracking target has been present in each block is measured for each of the plurality of blocks, a route for controlling the imaging range in the search area is determined, the route being determined based on the tracking-target presence time for each of the blocks, so that blocks having a longer tracking-target presence time are searched first, and the imaging range is controlled along the determined route.

6. A non-transitory computer readable storage medium storing a computer-executable program that when executed on a computer causes the computer to perform, a control method comprising:

changing an imaging state by controlling at least one of a pan, a tilt, and a zoom for of an imaging unit to track a tracking target;

setting a search area based on a range set by a user, a user operation for controlling the imaging range, or a past position of the tracking target;

enlarging the search area to include a detected position of the tracking target outside the search area in a case where the tracking target is detected outside the search area;

determining a zoom value for searching for the tracking target from a captured image from which a subject is detected, in a case where tracking of the tracking target has failed;

wherein, in a case where the tracking of the tracking target has failed, an imaging direction is controlled to search for the tracking target in the search area at the determined zoom value, the search area is divided into a plurality of blocks, a tracking-target presence time indicating a total time during which the tracking target has been present in each block is measured for each of the plurality of blocks, a route for controlling the imaging range in the search area is determined, the route being determined based on the tracking-target presence time for each of the blocks, so that blocks having a longer tracking-target presence time are searched first, and the imaging range is controlled along the determined route.

\* \* \* \* \*